April 6, 1926. 1,580,076
J. PAISSEAU
MACHINE FOR BEAD MANUFACTURE
Filed May 13, 1924 5 Sheets-Sheet 1
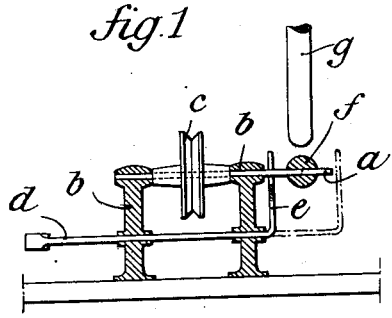
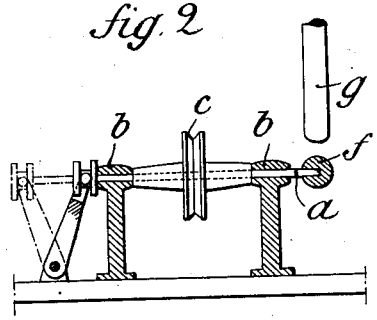
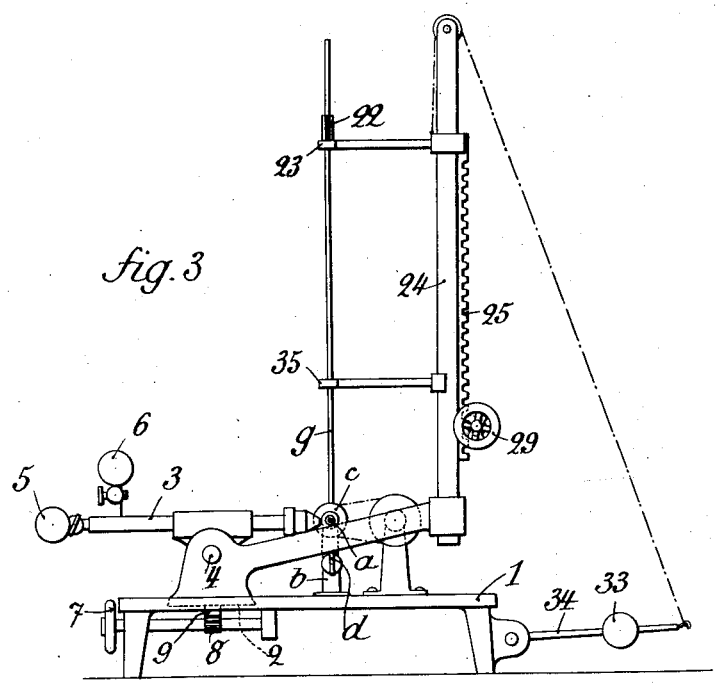
Inventor
Jean Paisseau
By
Attorneys April 6, 1926.  
J. PAISSEAU  
1,580,076

MACHINE FOR BEAD MANUFACTURE

Filed May 13, 1924    5 Sheets-Sheet 2

Inventor  
Jean Paisseau  
By  
Attorneys

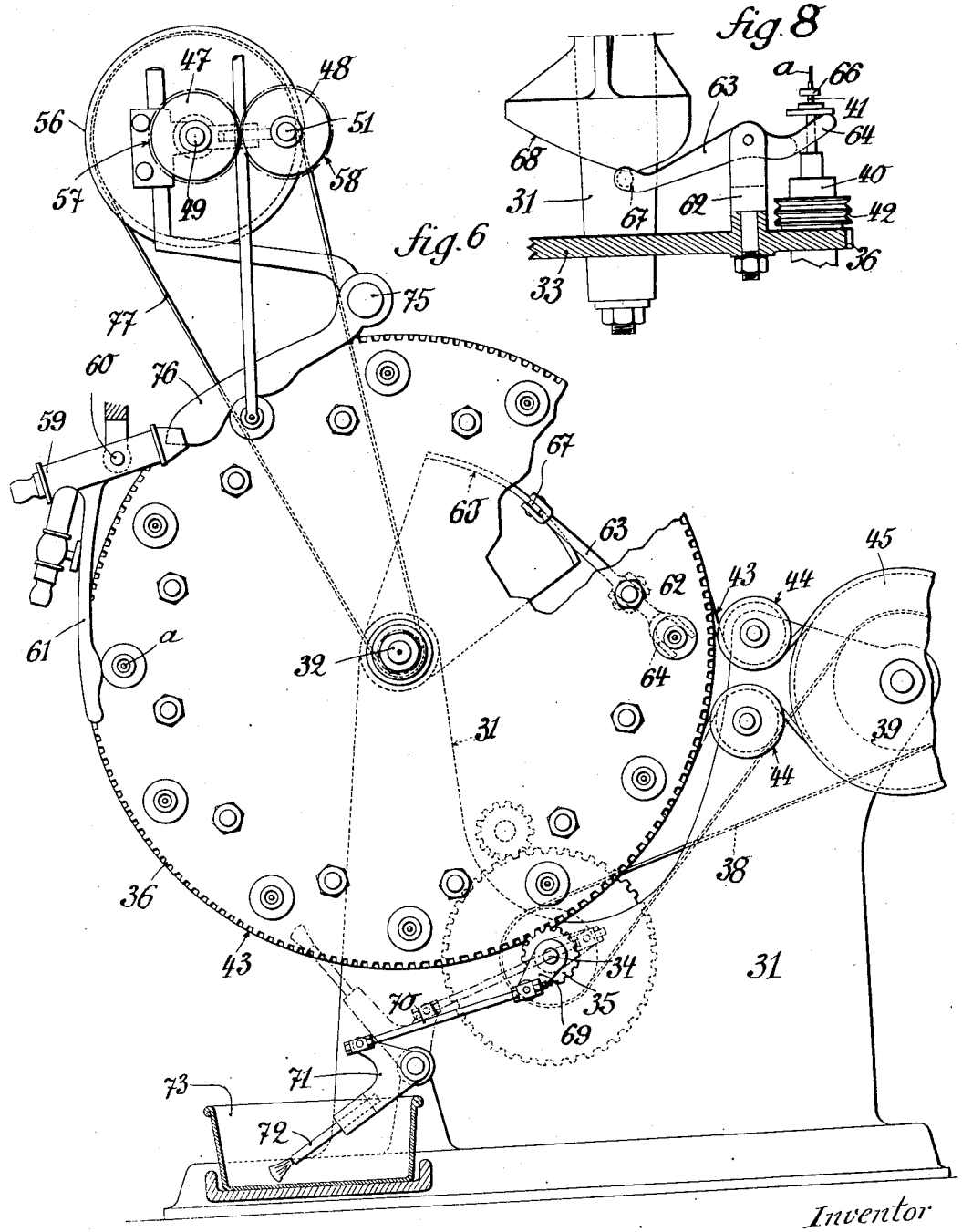

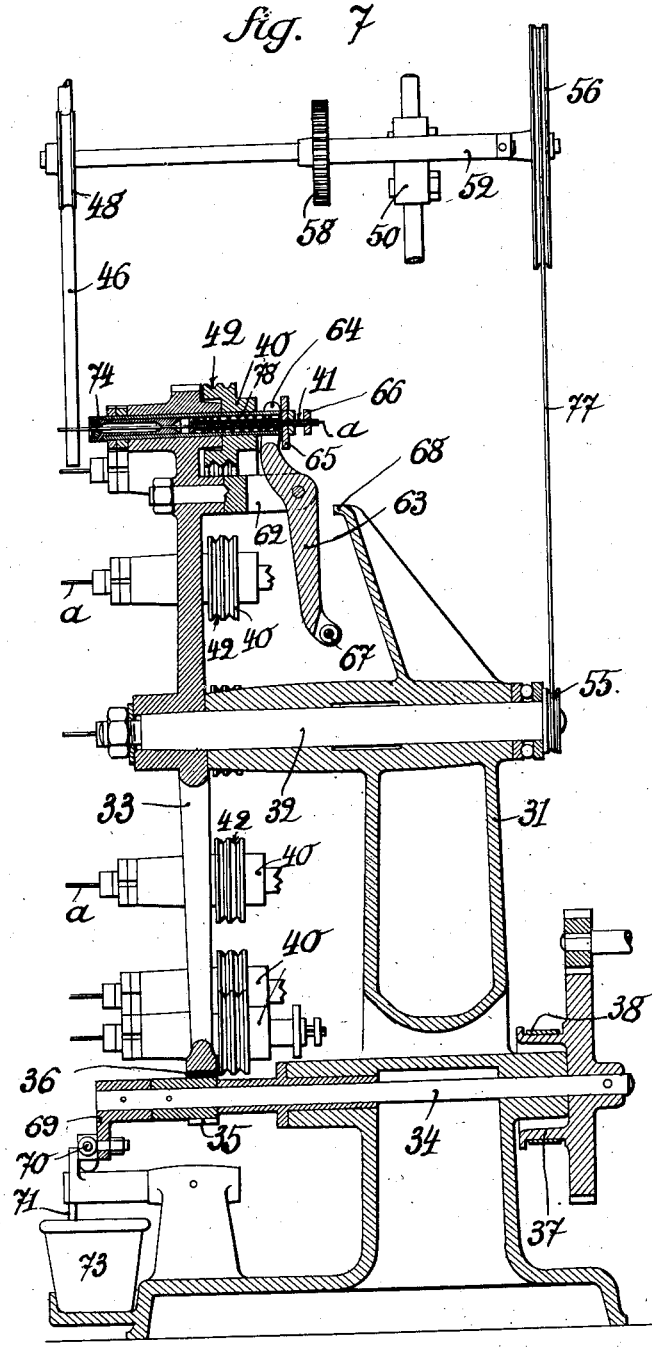

April 6, 1926.  1,580,076
J. PAISSEAU
MACHINE FOR BEAD MANUFACTURE
Filed May 13, 1924   5 Sheets-Sheet 5

Inventor
Jean Paisseau
By
Attorneys

Patented Apr. 6, 1926.

1,580,076

UNITED STATES PATENT OFFICE.

JEAN PAISSEAU, OF COURBEVOIE, FRANCE.

MACHINE FOR BEAD MANUFACTURE.

Application filed May 13, 1924. Serial No. 712,964.

*To all whom it may concern:*

Be it known that I, JEAN PAISSEAU, a citizen of the Republic of France, and residing at Courbevoie, Seine Department, No. 5 Rue Blondel, in the Republic of France, have invented certain new and useful Improvements in Machines for Bead Manufacture, of which the following is a specification.

My invention relates to an automatic machine for the manufacture of glass or enamel beads from a rod of the material which is melted in the blowpipe. The said machine essentially comprises one or more revoluble spindles having one or both ends free, upon which is placed the melted material forming the bead. It further comprises mechanical means for ejecting each bead from the spindle as fast as it is formed. Since the material is placed upon spindles having one end free, I am enabled to produce beads having either a single recess or a continuous hole, by mechanical means.

In a preferred form of construction, the said machine comprises a rotating barrel having mounted thereon a plurality of spindles in continuous rotation, said spindles coming successively opposite a blowpipe and a rod of enamel. The forward motion of the said rod is controlled by mechanical means, in concordance with the rotation of the barrel and the movements of the blowpipe. The said barrel is provided adjacent each spindle with a movable fork co-operating with a cam in order to provide for the ejection of each bead when it has been formed upon the said spindle.

However, the said arrangement is not the only one with which good results can be obtained, and the invention comprises like dispositions of the spindles and other elements serving for the mechanical production of the beads.

In particular, the spindles may be mounted on a fixed support, with all the spindles placed in a row, and co-operating with a series of inter-connected blowpipes and a series of inter-connected ejecting elements, all of the said elements operating simultaneously in order to produce a series of beads at the same time.

The appended drawing shows by way of example various embodiments of the invention.

Fig. 1 is a diagrammatic view of a machine having a single spindle, and

Fig. 2 is a modification.

Fig. 3 is a side elevation of a machine comprising a plurality of spindles placed in line.

Figure 5:
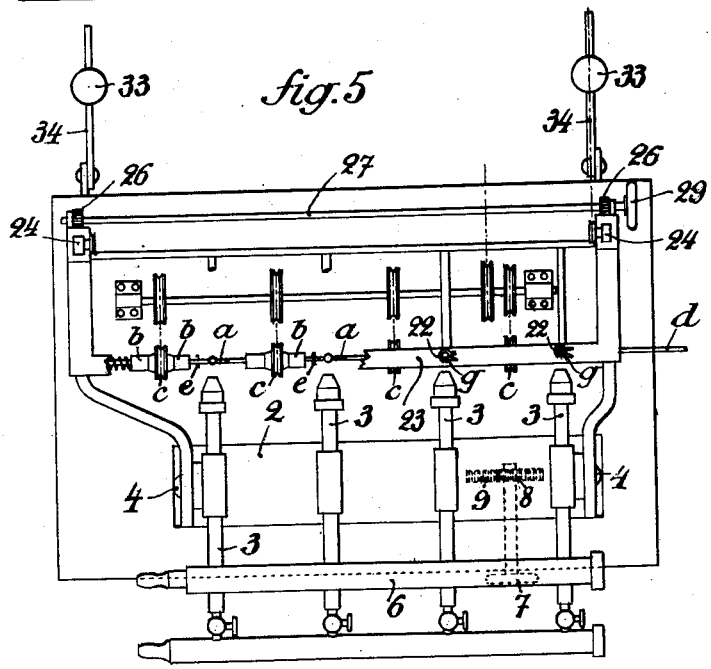

Fig. 5 a plan view of said machine.

Fig. 6 is a side view of a machine comprising a series of spindles mounted upon a barrel, with parts broken away.

Fig. 7 is a section on the axis of the barrel.

Fig. 8 is a partial plan view showing the ejecting elements.

Figure 9:
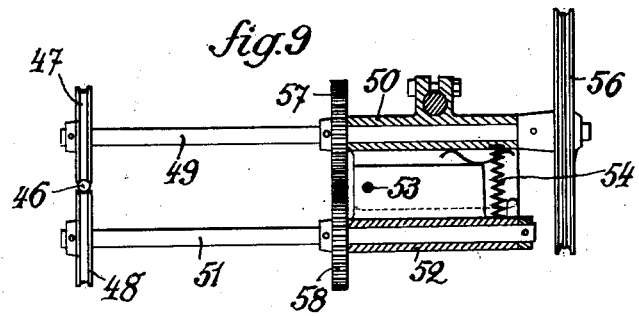

Fig. 9 is a plan view of the elements controlling the rod.

Figure 10:
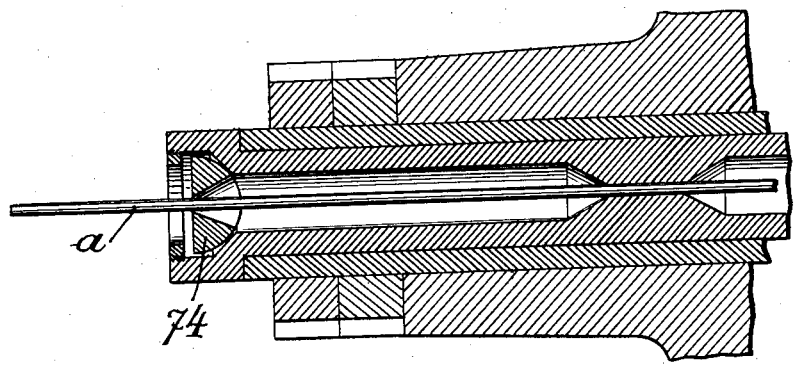
Figure 11:
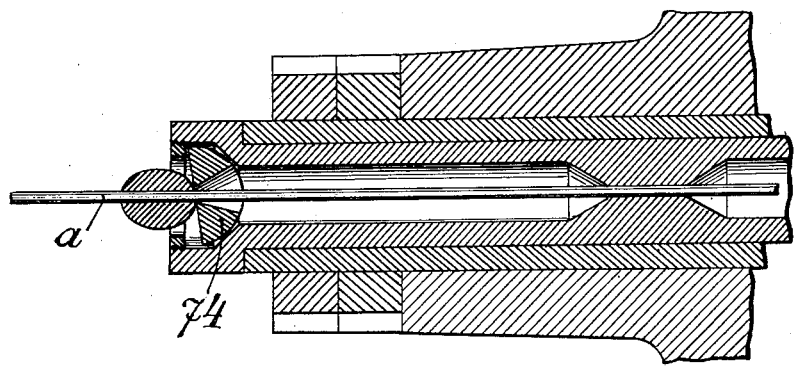

Figs. 10 and 11 show details of Fig. 7 on a larger scale, relative to a hemispherical stop-piece which is shown in two positions.

In Fig. 1, the spindle $a$ is mounted in the bearings $b$ and is rotated by means of a cable disposed upon a grooved pulley $c$ which is secured to the said spindle. In the said bearings is suitably guided the rod $d$ having thereon the ejecting fork $e$ which is slidable on the outer end of the said spindle and serves to remove from the latter the beads $f$ (having a continuous hole or a single recess) which are formed upon the said spindle by means of the glass rod $g$ and the blowpipe, not shown. The rod $d$ may be given a reciprocating motion in a regular manner by hand or by mechanical means.

In the modification shown in Fig. 2, the spindle $a$ is slidable in the bearings $b$ and also in the pulley $c$ which causes the spindle to rotate by means of a suitable groove and key. It is simply necessary to impart a reciprocating motion to the said spindle in order to eject each bead $f$ as it is formed, the bead coming into contact with the respective bearing $b$ whilst the spindle is drawn into the said bearing.

In all cases, the ejection can be readily carried out by coating the spindle with a layer of a refractory and readily destructible substance which prevents the glass or the enamel from adhering to the spindle and can be disaggregated by a slight effort.

Figure 4:
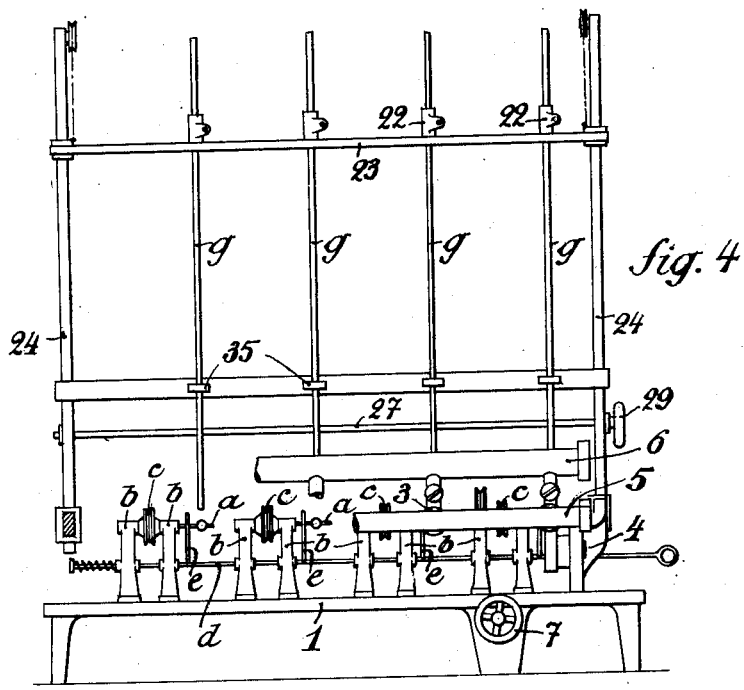
Fig. 4 is a front view.

The machine which is shown in Figs. 3 to 5 comprises a frame 1 upon which is longitudinally slidable a carriage or slide 2 carrying a plurality of blowpipes 3 which are adapted to swing together upon the trunnions 4; said blowpipes are supplied with gas and air by means of two apertured chambers 5 and 6 which are connected by flexible hose respectively with the gas and air piping.

The slide 2 is displaced for example by means of a hand wheel 7 controlling a pinion 8 co-operating with a rack 9 secured to the said slide.

A plurality of spindles *a* disposed in line are mounted in the bearings *b* which are disposed upon the stationary frame 1. All the spindles are rotated from a common shaft with which the pulleys *c* mounted upon the spindles are connected by endless cables; upon the said spindles are slidable the ejecting forks *e*, all of which are secured to a common rod *d* which is controlled by hand.

The rods of enamel or glass *g* are held by the clamps 22 disposed upon an apertured cross-piece 23 which is vertically slidable upon the uprights 24 secured to the slide 2. The said rods are further maintained at the bottom in the guides 35 attached to the uprights 24. The ends of the cross-piece 23 are supported by the racks 25 co-operating with the pinions 26 mounted upon the shaft 27 which is journalled in suitable supports secured to the uprights 24 and which is provided with a hand wheel 29. By means of the said hand wheel, all of the said rods can be lowered or raised at the same time, causing them to approach or to recede from the spindles *a*.

In this manner, in order to produce a number of beads at the same time, the whole set of blowpipes is operated by one hand while the set of rods is operated by the other hand by means of the wheel 29. It is advisable that the movement to be given to the hand wheel 29 by the operator shall require the same effort in all cases, irrespectively of the consumption of the rods and the resulting diminution in weight, and to this end the cross-piece 23 may be connected at each end with counterweights 33 disposed upon the swinging arms 34, so that as the cross-piece continues to descend, the lever arm of the said weights will become shorter, thus affording the constant balancing which is desired. Obviously, the same result could be obtained by various means.

To operate the machine, the enamel rods are so adjusted that their lower ends shall be exactly in line with the spindles, and these latter are then set in motion. The spindles are coated as above mentioned, and the blowpipes are lighted. When the ends of the enamel rods have become sufficiently melted, the said rods are lowered towards the rotating spindles by means of the hand wheel 29. At the same time, by means of the hand wheel 7, one imparts to the set of blowpipes and to the enamel rods, if necessary, a lateral reciprocating motion, with a displacement depending upon the size of the beads to be obtained. When the beads are finished, the enamel rods are again raised by means of the hand wheel 29.

Upon terminating the beads, the operator displaces the rod *d* with the forks *e* in order to eject all the beads from their respective spindles. Obviously, I may employ a machine of the above-described type comprising but a single blowpipe and rod-holder, in order to produce one bead at a time; in this event the use of the said machine still offers an advantage over hand manufacture, since the mechanical control of the blowpipe and the enamel rod will enable the process to be more accurately carried out, and with less fatigue to the operator.

The machine which is represented in Figs. 6 to 11, comprises a frame 31 having revoluble therein an axle 32 carrying the drum or barrel 33, the latter being rotated by a driving shaft 34 to which is keyed a pinion 35 engaging suitable teeth 36 formed on the said barrel. To the shaft 34 is also keyed a pulley 37 which is connected by a crossed belt with a second pulley 39. Upon the said barrel are revolubly mounted the sockets 40 in which are slidable the mandrels 41 holding the spindles *a* by pressure; the said sockets are secured to the pulleys *c* co-operating with a cable 43, two supporting rollers, and a second pulley 45 attached to the pulley 39, and in this manner the said spindles are rotated at the same time as the barrel.

The rod of enamel 46 is held between two rollers 47 and 48 provided with suitable grooves; the roller 47 is keyed to the shaft 49 which is revoluble in a support 50 mounted on the machine frame, whilst the roller 48 is keyed to a shaft 51 revoluble in a support 52 pivoting upon an axle 53 which is secured to the support 50. A suitable spring acts upon the shaft 51 in order to press the rod 46 between the said rollers. The rotation of said barrel is imparted to the shaft 49 by two pulleys 55 and 56, whilst the shafts 49, 51 are connected by two pinions 57, 58.

In these conditions, the ring is tightly held in place, and it is moved forward in a continuous manner; this motion is regulated so as to provide the necessary material for making one bead during the rotation of the barrel through the angle corresponding to two consecutive spindles. Independently of this continuous forward motion, the said rod is slightly raised and lowered in a periodic manner as occurs in the hand manufacture of beads, and to this end the support 50 is movably mounted on the machine frame, for instance upon a pivoting axle 75 and is secured to an arm having a cam outline 76 and coacting successively with the bosses of the drum; in this manner, during each partial rotation of the drum corresponding to the spacing of the consecutive spindles, one or more movements of oscillation of the proper amplitude will be produced at the desired instants, which movements will be imparted to the enamel rod, thus causing it to approach or to recede from the spindle which is moving at the same time below the said rod. These movements of the support 50 may be had by the use of an elastic cord 77 for imparting the motion of the pulley 55 to the pulley 56.

The blowpipe 59 is mounted upon an axle 60 and is secured to a cam-shaped arm 61 coacting with the bosses of the barrel during the rotation of the latter, whereby each boss will produce one or more oscillations of the said blowpipe during the manufacture of each bead. Adjacent each socket 40, the said barrel is provided with a support 62 to which is pivoted the lever 63. At one end of the latter is a fork 64 which is in contact with a washer 65 disposed between the socket 40 and a nut 66 screwed upon the mandrel 41; the other end of the lever is provided with a roller 67.

During the rotation of the barrel, the rollers 67 will co-operate successively with a stationary cam 68 secured to the machine frame; in this manner each of the levers 63 is pivoted about, thus withdrawing the mandrel 41 and the spindle a through the socket 40, so that the bead f which is formed on the end of the said spindle will come into contact with a bearing 74 mounted at the end of said socket and will thus be disengaged from the spindle, dropping into a suitable recipient, not shown. The bearing or stop-piece 74 has preferably a hemispherical shape and is so disposed as to pivot loosely in its recess whereby it will adapt itself to the irregular shapes of the beads, thus obviating all flexion of the spindle when the beads are drawn off (Figs. 10 and 11).

After each spindle has thus been withdrawn, it is brought back to the original position by the reaction spring 78.

It is advisable to employ a suitable coating upon the spindles to prevent the adhesion of the beads, and to this effect a crank 69 is mounted upon the driving shaft 34 and it controls—through the link 70—a bent lever 71; to the latter is attached the brush 72 dipping into a vessel 73 containing the suitable coating paste; the brush then applies the paste to the rotating spindle which is travelling at this moment above the vessel.

It will be observed that with the said machine, beads can be manufactured in an entirely automatic manner, the beads being disengaged and dropping into a recipient during the process.

By the use of the said spindles, I am enabled to produce beads having either a single recess or a continuous hole as desired, according as the beads are formed on the tip of the spindles or somewhat back of the extreme end.

Obviously, the support for the enamel or glass rod and the support for the blowpipe may have a slidable instead of a pivoting construction, and may be controlled by separate cams not mounted upon the barrel, said cams turning for instance through one revolution for each partial rotation or pitch distance of the barrel.

Claims:—

1. A machine for the manufacture of beads, comprising at least one or more rigid spindles, a support wherein the said spindle is revoluble, means for rotating the said spindle, at least one end of the said spindle extending outwardly of the said support, and ejecting means whereby the beads, which are formed on the end of the said spindle are ejected therefrom.

2. A machine for the manufacture of beads, comprising at least one or more rigid spindles, a support wherein the said spindle is revoluble as well as axially slidable, means for rotating the said spindle, at least one end of the said spindle extending outwardly of the said support, and ejecting means whereby the beads which are formed on the end of the said spindle are ejected therefrom, the said ejecting means consisting of a swinging arm whereby the said spindle can be moved lengthwise.

3. A machine for the manufacture of beads comprising a plurality of rigid spindles, a revoluble disc support wherein the said spindles are disposed according to a circumference of the said disc and parallel to its axis of rotation whereby the spindles shall be revoluble as well as axially slidable, means for the rapid rotation of said spindles in their support, means for the slow rotation of said support, ejecting arms pivoted to the said disc, each arm controlling the axial movement of its respective spindle, and a stationary cam cooperating with the said arms and causing the same to swing in succession.

4. A machine for the manufacture of beads comprising a plurality of rigid spindles, a revoluble disc support wherein the said spindles are disposed according to a circumference of the said disc and parallel to its axis of rotation whereby the spindles shall be revoluble as well as axially slidable, means for the rapid rotation of said spindles in their support, means for the slow rotation of said support, ejecting arms pivoted to the said disc, each arm controlling the axial movement of its respective spindle, and a stationary cam cooperating with the said arms and causing the same to swing in succession, a pivoting blowpipe, and means for pivoting the said blow-pipe each time that one of the said spindles passes before the same.

5. A machine for the manufacture of beads comprising a plurality of rigid spindles, a revoluble disc support wherein the said spindles are disposed according to a circumference of the said disc and parallel to its axis of rotation whereby the spindles shall be revoluble as well as axially slidable, means for the rapid rotation of said spindles in their support, means for the slow rotation of said support, ejecting arms pivoted to the said disc, each arm controlling the axial movement of its respective spindle, and a stationary cam cooperating with the said arms and causing the same to swing in succession, a pivoting blowpipe, means for pivoting the said blowpipe each time that one of the said spindles passes before the same, a pivoted rod-holder serving to maintain the rod of enamel which is melted to form the beads, means for pivoting the said rod-holder in concordance with the pivoting movements of the blowpipe, and feeding means provided upon the said rod-holder and adapted for the feeding of the said enamel rod concurrently with the running of the machine.

6. A machine for the manufacture of beads, comprising at least one rigid spindle, a support wherein the said spindle is revoluble as well as axially slidable, means for rotating the said spindle, at least one end of the said spindle extending outwardly of the said support, and ejecting means whereby the beads, which are formed on the end of the said spindle are ejected therefrom, the said support comprising a pivoting bearing of hemispherical shape for supporting the end of the said spindle, for the purpose set forth.

7. A machine for the manufacture of beads comprising a plurality of rigid spindles, a revoluble disc support wherein the said spindles are disposed according to a circumference of the said disc and parallel to its axis of rotation whereby the spindles shall be revoluble as well as axially slidable, means for the rapid rotation of said spindles in their support, means for the slow rotation of said support, ejecting arms pivoted to the said disc, each arm controlling the axial movement of its respective spindle, a stationary cam cooperating with the said arms and causing the same to swing in succession, a vessel adapted to contain a liquid, a pivoting brush dipping into the same and then ascending concurrently with the passage of the spindles, and means for pivoting the said brush in concordance with the rotation of the said barrel whereby a coating of the said liquid shall be successively placed upon each of the said spindles.

In testimony that I claim the foregoing as my invention, I have signed my name.

JEAN PAISSEAU.